United States Patent [19]

Rohweder et al.

[11] Patent Number: 5,820,147
[45] Date of Patent: Oct. 13, 1998

[54] STEERABLE SOLID AXLE SUSPENSION FOR A VEHICLE

[75] Inventors: David Scott Rohweder, Troy; Jeffrey Michael Hatt, Livonia; Chunping John Meng, Rochester Hills, all of Mich.

[73] Assignee: Ford Global Technologies, Inc., Dearborn, Mich.

[21] Appl. No.: 829,650

[22] Filed: Mar. 31, 1997

[51] Int. Cl.⁶ ........................................................ B62D 7/16
[52] U.S. Cl. .................... 280/93.51; 280/93.507
[58] Field of Search ..................... 280/771, 846, 280/93, 95.1, 93.51, 93.502, 93.507; 180/400, 434, 435, 437

[56] References Cited

U.S. PATENT DOCUMENTS

| | | |
|---|---|---|
| 3,556,554 | 1/1971 | Saward . |
| 3,944,247 | 3/1976 | Cook ........................................ 280/726 |
| 4,364,578 | 12/1982 | Ikeda et al. ............................. 280/846 |
| 4,678,204 | 7/1987 | Hetherington . |
| 4,977,733 | 12/1990 | Samejima et al. . |
| 5,228,665 | 7/1993 | Berghus et al. . |
| 5,401,049 | 3/1995 | Richardson ............................. 280/718 |
| 5,433,470 | 7/1995 | Long . |

FOREIGN PATENT DOCUMENTS 662-382  5/1979  U.S.S.R. .

OTHER PUBLICATIONS

Econoline, F–150, F–250, F–350, Bronco, F–Super Duty 1994 Body/Chassis Service Manual, pp. 04–01A–4 and 11–03–7.

Primary Examiner—Paul N. Dickson
Attorney, Agent, or Firm—Gregory P. Brown

[57] ABSTRACT

A novel steerable solid axle suspension system capable of eliminating the need for steering dampers includes a solid axle (12) suspended from a vehicle frame (14) by leaf spring assemblies (48) and right and left shock absorbers (30, 38). The suspension also includes a track bar (140) laterally connecting the solid axle (12) to the frame (14). The suspension also includes a steering gear (132) having a pitman arm (130) connected to a drag link (128). The drag link (128) extends downwardly to connect to a tie rod (122) which extends between and interconnects first and second steering knuckles (24, 22).

8 Claims, 6 Drawing Sheets

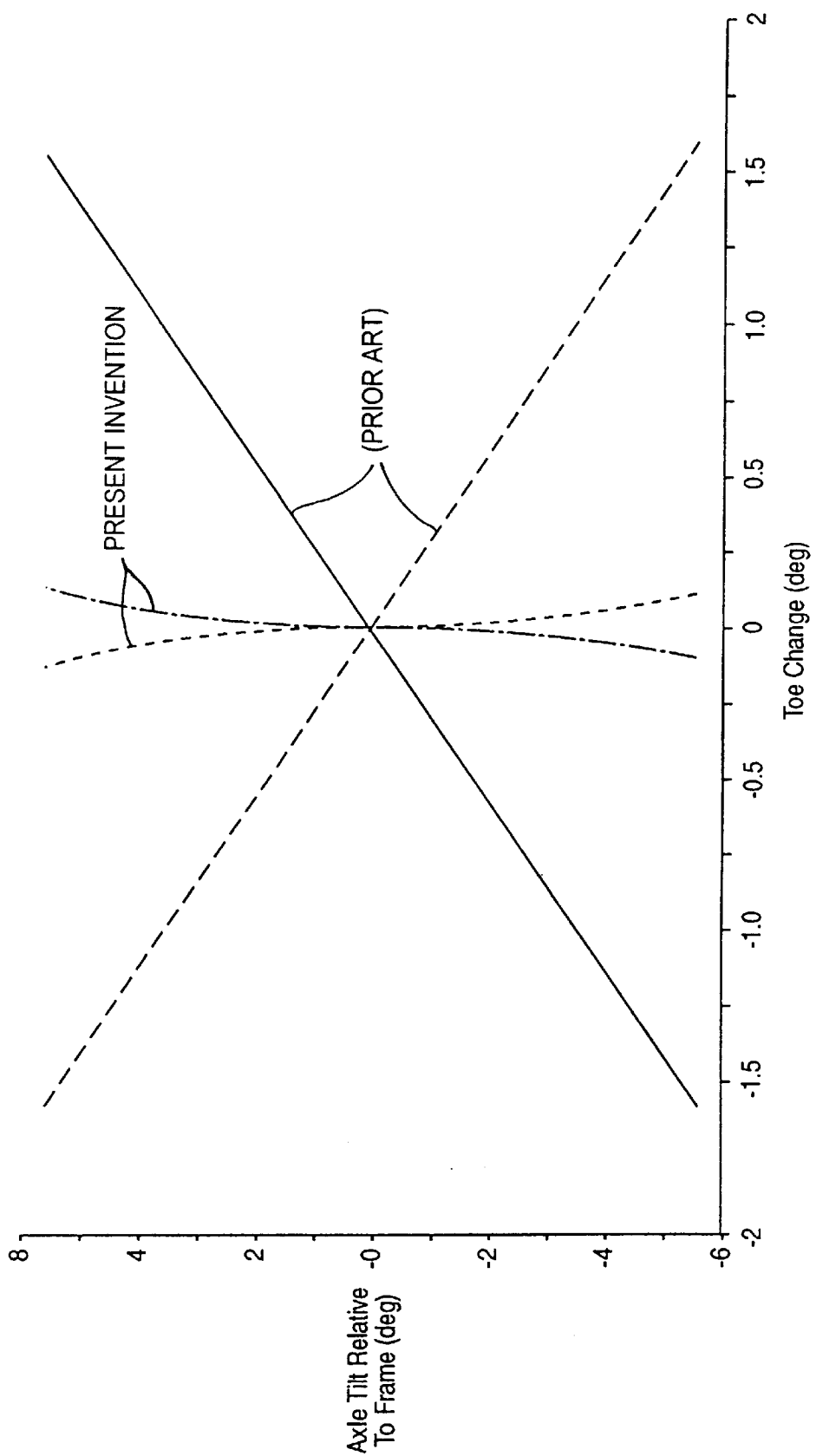

STEERABLE SOLID AXLE SUSPENSION FOR A VEHICLE

BACKGROUND OF THE INVENTION

1. Field of the Invention

This invention relates generally to steerable suspension systems for use in a motor vehicles. More particularly, the present invention relates to steerable suspension systems having a solid axle, usually found on the front of the vehicles designed for carrying heavy payloads.

2. Disclosure Information

Steerable solid axles are commonly used in heavy payload vehicles, such as commercial trucks. They exhibit great capacity for weight, while requiring fewer parts and less labor to manufacture than other known alternatives. One example of such a suspension may be found on a 1994 Ford F-Super Duty Commercial Truck. This suspension is a variant of what is commonly referred to by engineers and designers of such suspensions as a Hotchkiss design.

One well known shortcoming of Hotchkiss suspensions, and many other steerable solid axle suspensions is a steering mode phenomena that occurs under certain operating conditions and is immediately perceptible to a vehicle operator. Generally, the condition communicates its existence throughout the steering system to the operator's hands on the steering wheel, however, in some instances it can be detected by a visible vibration of the instrument panel or perhaps tactilely through the floor of the passenger compartment. All of these situations are highly undesirable from a customer satisfaction standpoint, and therefore has been the focus of much engineering effort.

The predominant solution heretofore has been the incorporation of a steering damper adapted from a conventional suspension shock absorber. The damper is situated between a stationary point on the vehicle, commonly the frame or axle, and some point on the steering mechanism, such as a drag link. In this way, the damper can resist undesirable oscillatory motion of the steering system throughout the drag link before it is transmitted to the operator. While this solution has been successful at controlling the steering mode phenomena, it adds cost and complexity to the suspension, and depending on the suspension, can present a significant warranty item for manufacturers.

It would therefore be desirable to provide a steerable solid axle suspension free from the previously mentioned steering mode phenomena that has heretofore required the use of steering dampers.

SUMMARY OF THE INVENTION

According to the present invention, a novel steerable solid axle suspension apparatus for a vehicle has been discovered. This suspension overcomes the need to include a steering damper on such a suspension as well as improves the overall steering performance of the vehicle.

The suspension apparatus includes a vehicle frame having a first longitudinal member and a second longitudinal member, each having a forward end, a rearward end associated therewith, there also being a transverse member having a right end attached to the first longitudinal member and extending transversely to a left end which is attached to the second longitudinal member.

A solid axle is transversely mounted beneath the first and second longitudinal members of the vehicle frame. The solid axle includes top and bottom sides, first and second ends, each having a forward side and a rearward side. A first steering knuckle connects to the first end of the axle and a second steering knuckle connects to the second end of the axle.

The suspension apparatus also includes a tie rod having a first end connecting to the first steering knuckle and extending to a second end connected to the second steering knuckle. A drag link includes a first end connected to a pitman arm and a second end connected to the tie rod at a point adjacent the first end of the tie rod. The first and second ends of the tie rod and the first and second ends of the drag link are cooperatively located so as to cause the first and second steering knuckles to exhibit substantially neutral roll steer.

Advantageously, the positioning of these connections permits the decoupling of the steering mode from suspension tilt motion generated by typical driving and road inputs to the suspension. As a result, the steering system does not transmit suspension generated steering action. Thus eliminating the need for steering dampers to control this form of feedback.

BRIEF DESCRIPTION OF THE DRAWINGS

FIG. 6 is a plot showing the roll steer characteristics of a prior art suspension and of the present invention.

DETAILED DESCRIPTION OF THE PREFERRED EMBODIMENT

Figure 1:
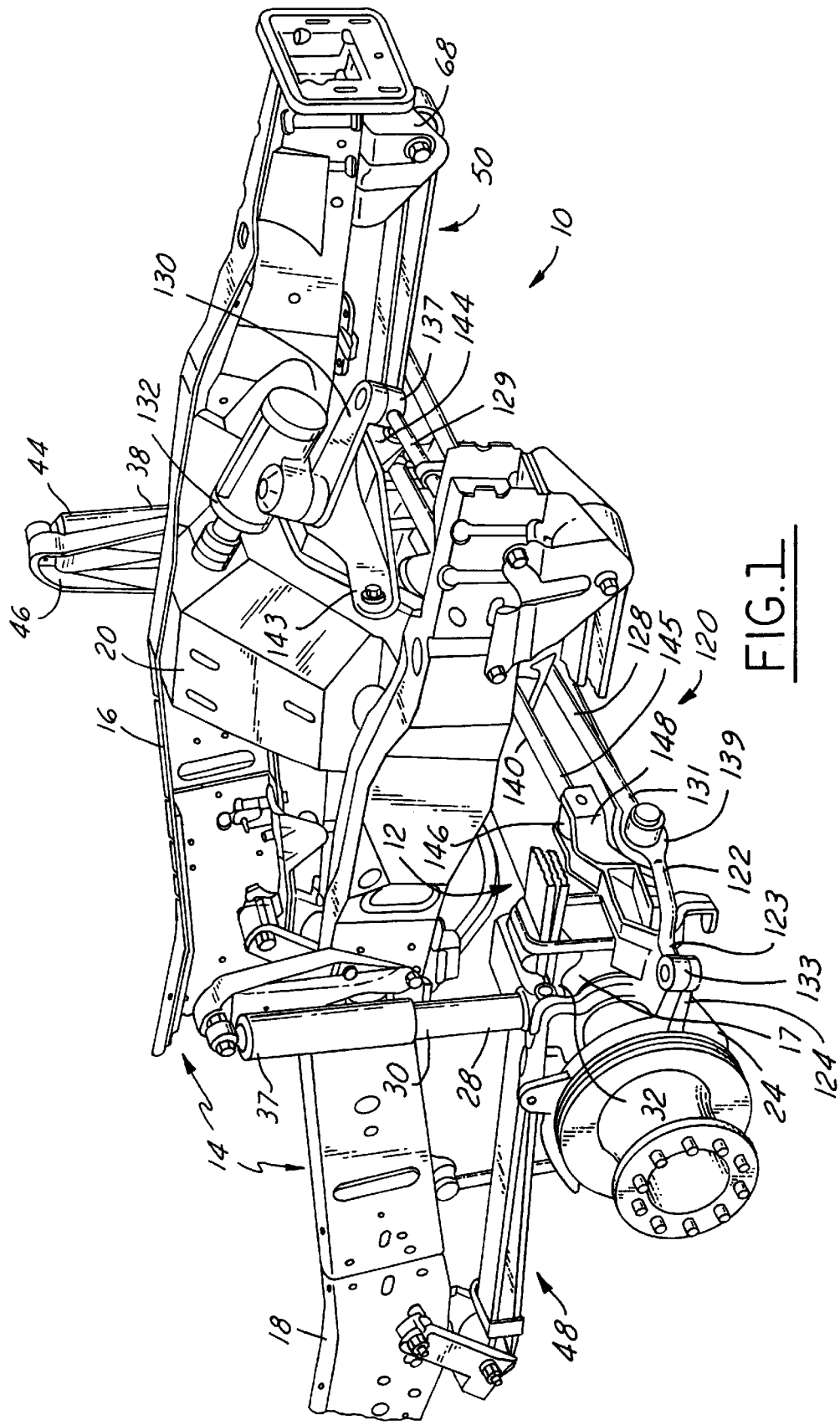
FIG. 1 is a perspective view of a motor vehicle chassis having a steerable solid axle suspension constructed in accordance with the present invention.
Figure 2:
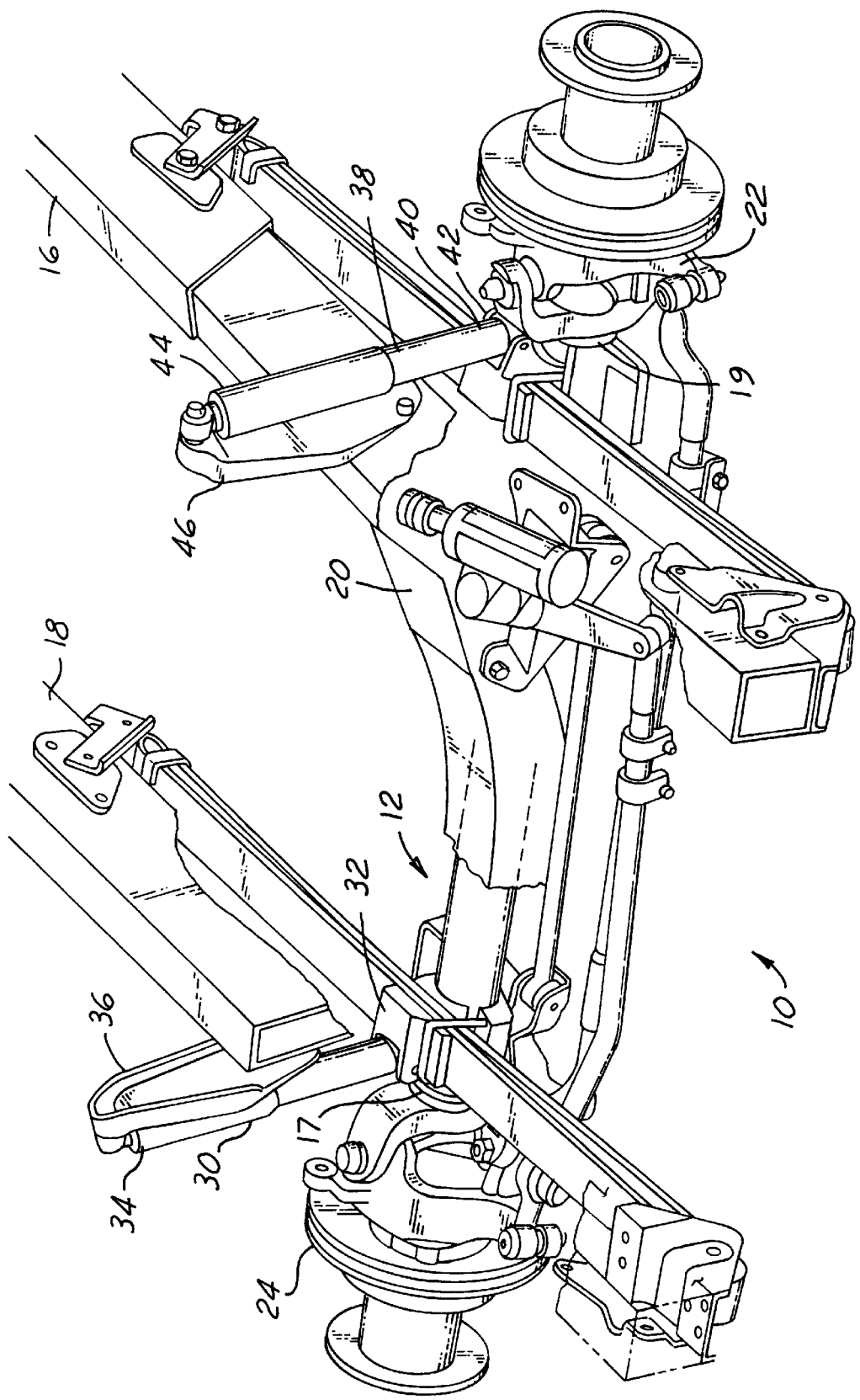
FIG. 2 is a perspective view of a right side of a motor vehicle chassis having a steerable solid axle suspension in accordance with the present invention.
Figure 4:
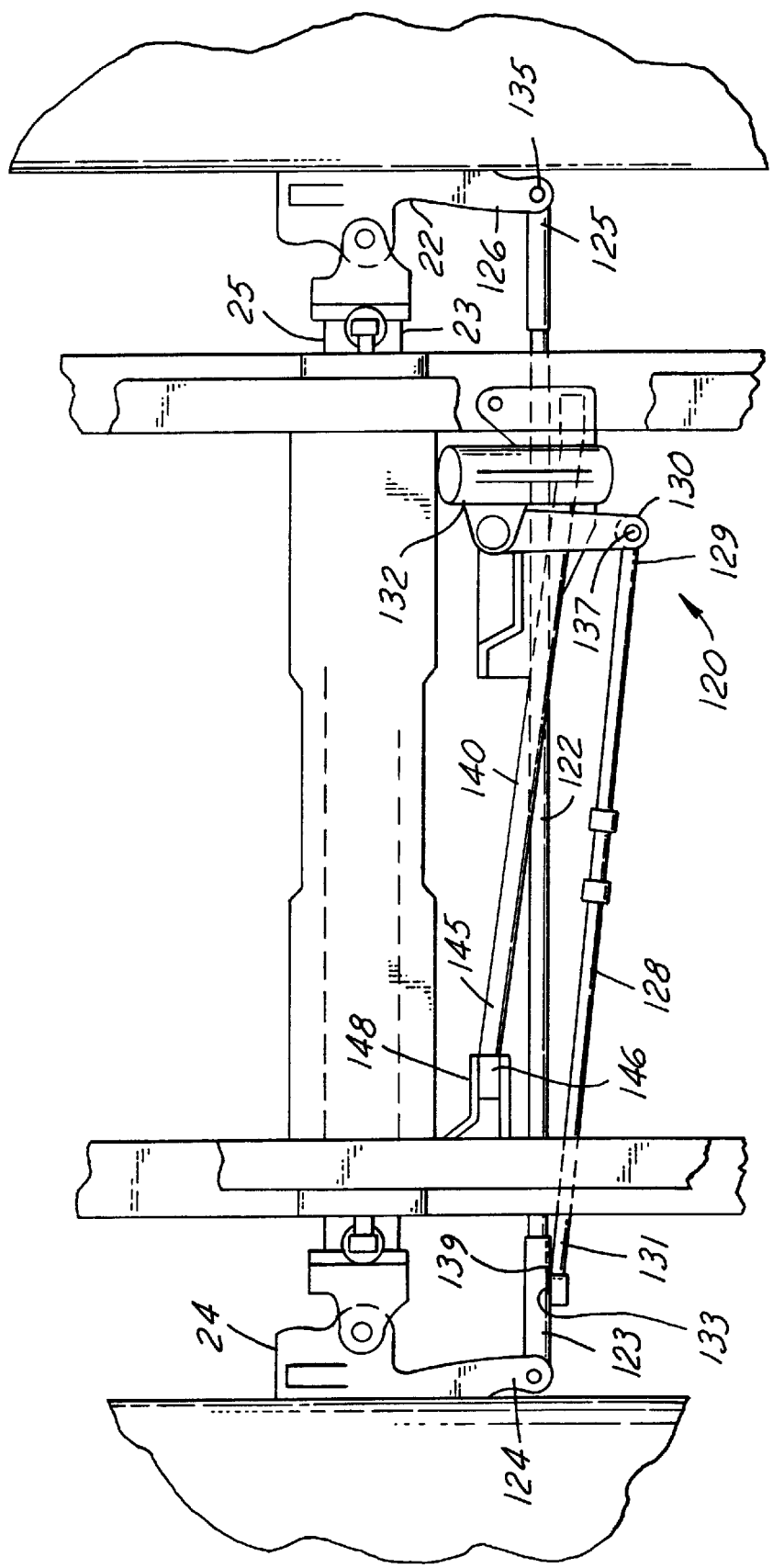
FIG. 4 is a top view of a motor vehicle chassis having a steerable solid axle suspension in accordance with the present invention.
Figure 5:
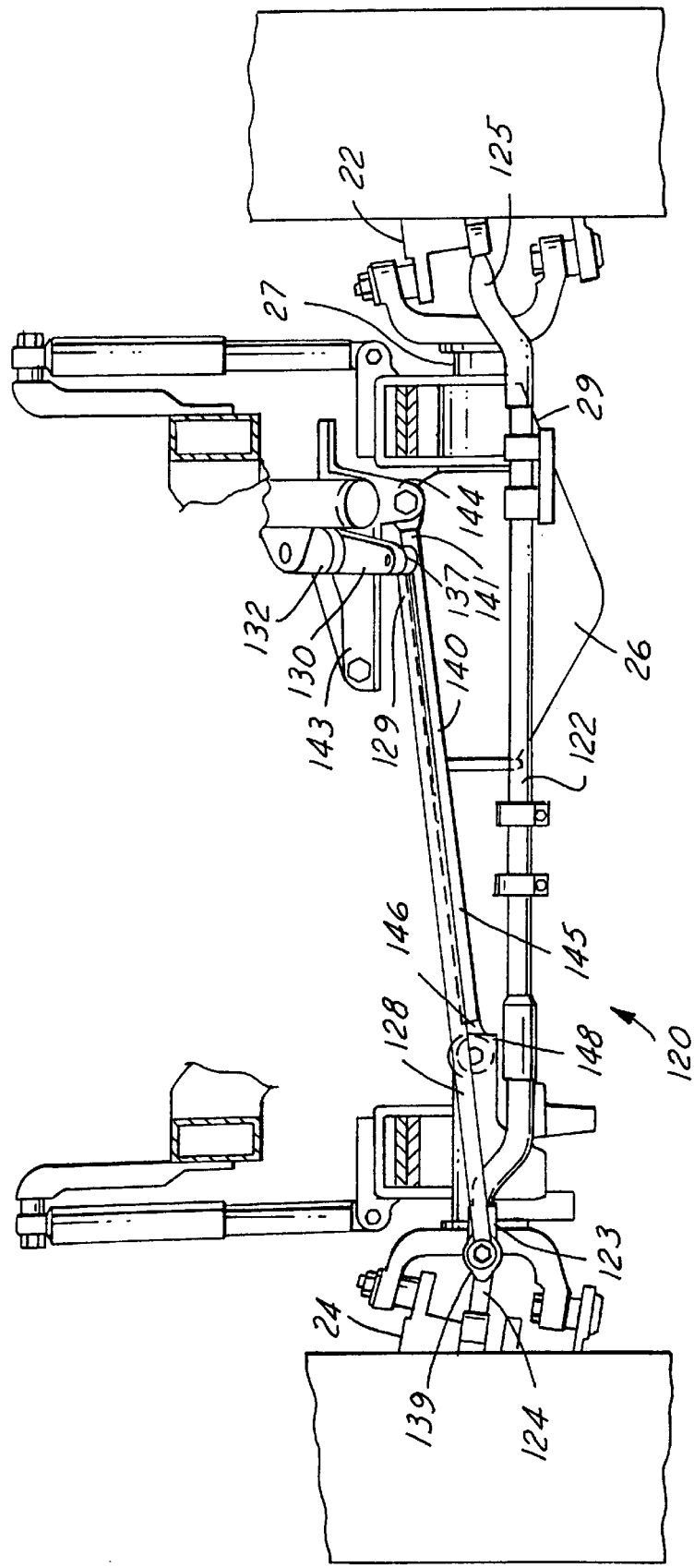
FIG. 5 is a front view of a motor vehicle chassis having a steerable solid axle suspension in accordance with the present invention.

Referring now to FIGS. 1 and 2, a steerable solid axle suspension 10 for a vehicle includes a solid axle 12 disposed beneath a forward end of a vehicle structure. The vehicle structure may be of the conventional unibody construction, or as is shown, the vehicle frame 14 of a conventional body-on-frame construction. The vehicle frame 14 shown in the figures has a first longitudinal member 16 on the left side of the frame 14, a second longitudinal member 18 on the right side of the frame 14, and a transverse member 20 connecting the two longitudinal support members 16 and 18. The axle 12 has a first end 17 and a second end 19. Referring to FIG. 4, each end of the axle 12 has a forward side 23 and a rearward side 25, the forward side being the front half of the axle 12 as the axle 12 lies in the assembled suspension system, and the rearward side being the rear half of the axle 12. Referring to FIG. 5, the axle 12 has a top side 27 and a bottom side 29, the top side 27 being the upper half of the axle 12 as the axle 12 lies in the assembled suspension system, and the bottom side 29 being the rear half of the axle 12. A front axle differential 26 lies intermediate the left and right ends of the front axle 12 shown in the figures.

Referring back now to FIGS. 1 & 2, the first and second steering knuckles 24 and 22 are operatively connected in a conventional manner to the two respective ends of the front axle 12. The first steering knuckle 24 lies adjacent the first longitudinal member of the vehicle frame 14 while the second steering knuckle 22 lies adjacent the second longitudinal side of the vehicle frame 14.

In the preferred embodiment, a bottom end 28 of a first shock absorber 30 pivotally connects in a conventional manner through bracket 32 to the axle 12 at the top side of the first end of the axle 12. A top end 34 of the first shock absorber 30 pivotally connects in a conventional manner at the bracket 36 to a point on the vehicle frame 14 above of the bottom end 28 such that the first shock absorber 30 stands substantially vertical when mounted as a part of the vehicle suspension system.

A second shock absorber 38 is attached in a conventional manner at its bottom end 40 through the bracket 42 to the top side of the second end 19 of axle 12. A top end 44 of the second shock absorber 38 connects in a conventional manner at bracket 46 to a point on the vehicle frame 14 above of the bottom end 40 such that the second shock absorber 38 stands substantially vertical when mounted as a part of the vehicle suspension system. The first and second shock absorbers 30 and 38 are preferably placed as far outboard on the axle as possible to optimize the shock absorber lever ratio for vehicle roll conditions. It also should be noted that the orientation of the shock absorbers depends on the overall configuration of the suspension. For instance, the shock absorber could be advantageously connected forward or rearward of the axle 12, or even connected to the other components of the suspension.

Figure 3:
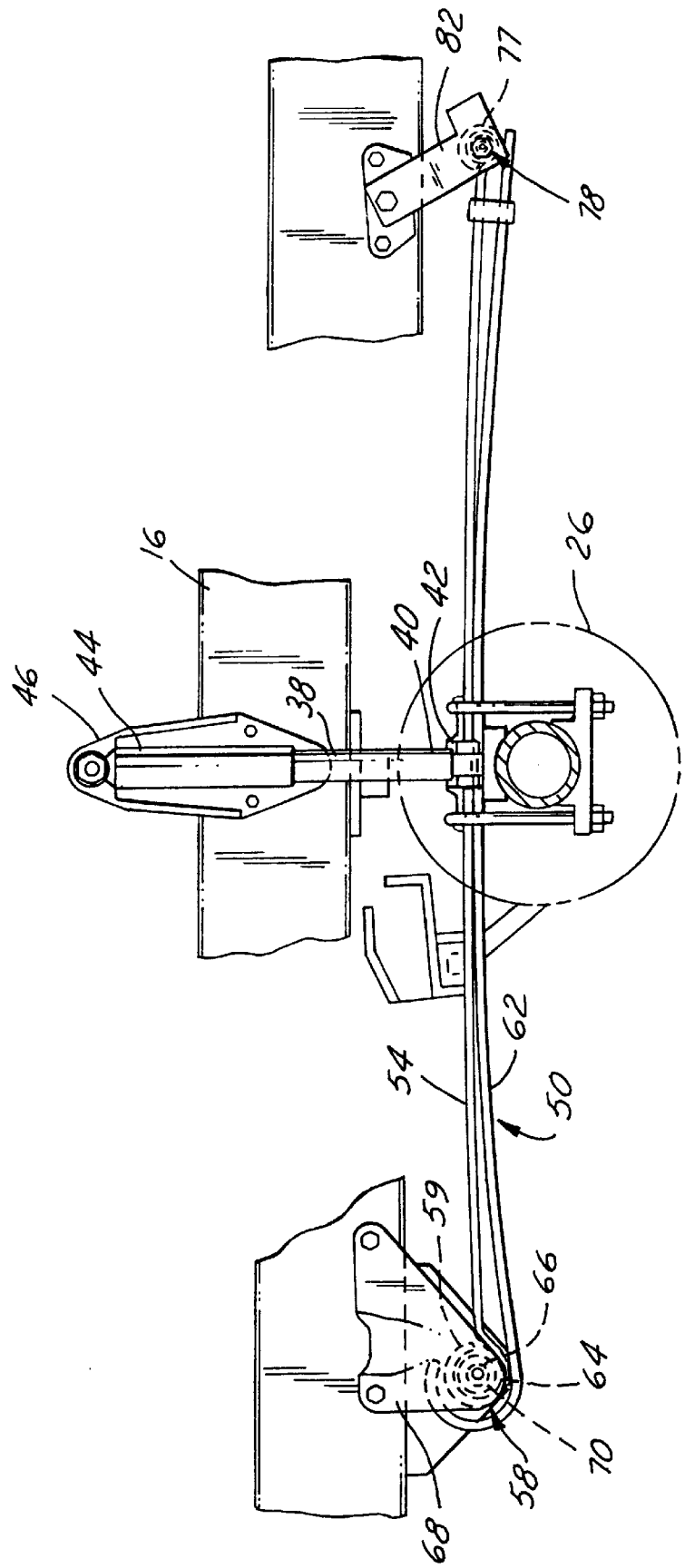
FIG. 3 is an side view of a leaf spring for a steerable solid axle suspension in accordance with the present invention.

Referring now to FIGS. 1 and 3, the preferred suspension system includes overslung leaf springs 48 and 50. It has been discovered that overslung leaf springs provide improved lateral compliance. It should be noted, however, other spring configurations are contemplated as within the scope of the present invention, as long as the overall suspension exhibits sufficient lateral control of the solid axle 12. These two front leaf springs 48 and 50 includes main leaf plates 52 and 54, each having a circular eye 57, 59 formed at a forward ends of the main leaf plates. Conventional circular-shaped bushings 56 and 58 are adapted to be received and retained within the circular eyes on the forward ends of the main leaf plates 52 an 54 when the leaf springs are mounted to the vehicle frame 14 as a part of the suspension system. The leaf spring assemblies may also include one or more tapered or non-tapered leaf plates 60 and 62 secured above or below the main leaf plates 52 and 54.

Attachment of the left side leaf spring assembly 48 to the vehicle frame will now be described, it being understood that the right side is the symmetric equivalent, and therefore will not be described in detail. The circular bushing preferably includes a large outer metal can 64 that has a circular or otherwise oblong shape. An inner metal sleeve 66 disposed along the central axis of the outer can 64 is designed to receive a retaining bolt to secure the forward end of the leaf spring 48 to the vehicle frame through bracket 68. Rubber 70 has a predetermined durometer and fills annular space between the inner sleeve 66 and outer can 64.

Shackle eye 77 is formed at the rearward end of the main leaf plate 54 to retain circular-shaped bushings 78. The rearward end of the leaf spring 50 is mounted to the shackle assembly 82, which in turn mounts to the vehicle frame 14.

Referring now to FIGS. 1, 4 and 5, the suspension system includes a steering linkage assembly 120. A tie rod 122 pivotally connects at a first end 123 to a lower steer arm 124 on the first steering knuckle 24 to create a first joint 133 and at a second end 125 to a lower steer arm 126 on the second steering knuckle 22 to create a second joint 135. A drag link 128 has a first end 129 pivotally connected to a pitman arm 130 to create a third joint 137. The pitman arm 130 is, in turn, connected to the steering gear 132 for rotation in response to input from a vehicle operator. The second end 131 of the drag link 128 pivotally connects to the tie rod 122 at a point adjacent to the first end 123 of the tie rod 122 to create a fourth joint 139. It is desireable to attach the drag link 128 to the tie rod 122 in this manner rather than directly to the steering knuckle 22. This is because there is a perceptible reduction in forces transmitted through the steering system when constructed in this manner.

As is best shown in FIG. 5, the drag link 128 extends between the pitman arm 130 and the tie rod 122 forming a first downward sweep angle when orthogonally projected onto a vertical plane in which the solid axle 12 lies when installed in the vehicle. As can best be seen in FIG. 4, the drag link 128 extends between the pitman arm 130 and the tie rod 122 at a first rearward sweep angle that can be viewed and measured when orthogonally projected onto a horizontal plane in which the solid axle 12 lies when installed in the vehicle.

A track bar 140 pivotally connects in a conventional manner at a first end 141 to a track bar bracket 144 depending downwardly from a triangulating member 143. The triangulating member extends between the second longitudinal and the transverse members of the vehicle frame so as to permit the preferred positioning of the upper track bar joint 142 immediately behind the first joint 137 of the pitman arm and the drag link. A second end 145 of the track bar 140 pivotally connects in a conventional manner to the axle 12 adjacent to the first longitudinal member of the vehicle frame 14 through the lower track bar joint 146 and bracket 148. The two connection points of the track bar 140 are selected so as to minimize ride steer and the binding forces imposed on the brackets 144 and 148 by the track bar 140 in the ride mode.

As is best shown in FIG. 5, the track bar 140 extends between the upper track bar joint and the lower track bar joint forming a second downward sweep angle when orthogonally projected onto a vertical plane in which the solid axle 12 lies when installed in the vehicle. As can best be seen in FIG. 4, the track bar 140 also forms a second rearward sweep angle that can be viewed and measured when orthogonally projected onto a horizontal plane in which the solid axle 12 lies when installed in the vehicle. The rearward sweep angle of the track bar 140 preferably is substantially the same as the rearward sweep angle of the drag link 128. The track bar 140 preferably has a length that is substantially equal to the length of the drag link 128.

Referring now to FIGS. 1, 5 and 6, the location of the first, second, third and fourth joints 133, 135, 137 and 139 as well as the upper and lower track bar joints 142, 146 are positioned to kinematically guide wheel and tire assemblies mounted on first and second steering knuckles 24, 22 through substantially zero toe change when the axle 12 is tilted through a predetermined angle relative to the vehicle structure 14 when maintained in a horizontal plane, otherwise frequently referred to as vehicle roll motion. This is also known as the roll steer characteristic, for which FIG. 6 provides an illustrative example of roll steer for a prior art suspension and steering system (marked prior art) as well as for the present invention (marked present invention.)

For example, referring specifically to FIG. 6, for a predetermined amount of vehicle roll, for instance two degrees, which can be simulated by applying a vertical force on an open door of a vehicle. If the tires are resting on a substantially frictionless surface (such as an air bearing plate) each of the steering knuckles on the axle, and the tires and wheels mounted thereon, will experience a change in toe angle (toe angle is the statically measured angle between the straight ahead position of the tire and the position the tire is actually pointing.) The air bearings permit the tires to change angles as they would if they were rolling on the ground. It can be seen from the chart that a vehicle having a prior art suspension would undergo a toe angle change of plus or minus one half of one degree. (Thus simulating for instance, a right turn, or only a right wheel going over a bump, sufficient to cause the axle 12 to tilt two degrees, would cause the right and left wheels to both turn one half of one degree in to the left.) It has been discovered that this characteristic, on solid axle suspensions, can induce undesirable steering system feedback. In order to reduce this problem, prior art suspensions have incorporated steering dampers.

It has been further discovered that by tuning the location of the first, second, third and fourth joints 133, 135, 137 and 139 as well as the upper and lower track bar joints 142, 146, the slope of the toe change for a given wheel can be maintained at substantially zero for the first degree of tilt. Furthermore, the amount of toe change can be kept substantially near zero throughout a predetermined range of tilt. The preferred embodiment exhibits less than one half of one degree of toe change throughout the range of tilt. Significantly, this decouples the steering feedback phenomena from the suspension motion, such as tilt due to cornering or a wheel going over a bump or through a chuckhole, as on an undulating road. This has eliminated the need for costly steering dampers previously required on vehicles with steerable solid axles.

Although certain embodiments of the invention have been described and illustrated herein, it will be readily apparent to those of ordinary skill in the art that a number of modifications and substitutions can be made to the solid axle front suspension system disclosed and described herein without departing from the true spirit and scope of the invention.

We claim:

1. A steerable, solid axle suspension apparatus for a vehicle, comprising:
    a vehicle structure;
    a solid axle transversely disposed beneath said vehicle structure, said solid axle having top and bottom sides, first and second ends, each of said ends of said solid axle having a forward side and a rearward side;
    a first steering knuckle connected at said first end of said axle;
    a second steering knuckle connected at said second end of said axle;
    a tie rod having a first end connected to said first steering knuckle and extending to a second end connected to said second steering knuckle;
    a drag link having first and second ends, said first end being connected to a pitman arm and said second end being connected to said tie rod adjacent to said first end of said tie rod; a track bar having first and second ends, said first end of said track bar being connected to said vehicle structure at an upper attachment point and said second end of said track bar being connected to said solid axle adjacent to said first end of said solid axle; said drag link forming a first downward sweep angle when orthogonally projected onto a vertical plane in which said solid axle of said vehicle lies and said first and second ends of said track bar being located such that when orthogonally projected onto said vertical plane, said track bar follows said first downward sweep angle created by said drag link; and
    said first and second ends of said tie rod and said first and second ends of said drag link being cooperatively located so as to cause said first and second steering knuckles to exhibit substantially neutral roll steer.

2. A steerable, solid axle suspension apparatus for a vehicle as set forth in claim 1, further comprising:
    a first shock absorber having a top end and a bottom end, said first shock absorber connected at said bottom end to said top side of said solid axle adjacent to said first end and connected at said top end to a point on said vehicle structure above said bottom end of said first shock absorber; and
    a second shock absorber having a top end and a bottom end, said second shock absorber connected at said bottom end to said top side of said solid axle adjacent to said second end and connected at said top end to a point on said vehicle structure above said bottom end of said second shock absorber.

3. A steerable, solid axle suspension apparatus for a vehicle as set forth in claim 1, further comprising a first leaf spring assembly disposed on said top side of said solid axle adjacent to said first end and a second leaf spring assembly disposed on said top side of said solid axle adjacent to said second end, each of said leaf spring assemblies having a main leaf plate having a forward eye formed at a forward end of said main leaf plate and a shackle eye formed at a rearward end of said main leaf plate.

4. A steerable, solid axle suspension apparatus for a vehicle, comprising:
    a vehicle frame having a first longitudinal member and a second longitudinal member, each having a forward end, a rearward end associated therewith, there also being a transverse member having a right end attached to said first longitudinal member and extending transversely to a left end attached to said second longitudinal member;
    a solid axle transversely disposed beneath said first and second longitudinal members of said vehicle frame, said solid axle having top and bottom sides, first and a second ends, each of said ends of said solid axle having a forward side and a rearward side;
    a first shock absorber having a top end and a bottom end, said first shock absorber connected at said bottom end to said top side of said solid axle adjacent to said first end and connected at said top end to a point on said vehicle frame above said bottom end of said first shock absorber;
    a second shock absorber having a top end and a bottom end, said second shock absorber connected at said bottom end to said solid axle adjacent to said second end and connected at said top end to a point on said vehicle frame above said bottom end of said second shock absorber;
    a first leaf spring assembly disposed on said top side of said solid axle adjacent to said first end and a second leaf spring assembly disposed on said top side of said solid axle adjacent to said second end;
    a first steering knuckle connected at said first end of said axle;
    a second steering knuckle connected at said second end of said axle;
    a tie rod having a first end connected to said first steering knuckle creating a first joint and extending to a second end of said tie rod connected to said second steering knuckle and creating a second joint;

a drag link having first and second ends, said first end being connected to a pitman arm thereby creating a third joint and said second end of said drag link being connected to said tie rod adjacent to said first end of said tie rod thereby creating a fourth joint, said drag link forming a first downward sweep angle when orthogonally projected onto a vertical plane in which said solid axle of said vehicle lies;

a triangulating member connected to said second longitudinal member and extending to connect to said transverse member, said triangulating member having a track bar bracket extending downward therefrom; and a track bar having first and second ends, said first end of said track bar being connected to said track bar bracket and said second end of said track bar being connected to said solid axle adjacent to said first end of said solid axle, said first and second ends of said track bar being located such that when orthogonally projected onto said vertical plane, said track bar follows said first downward sweep angle formed by said drag link;

said first, second, third and fourth joints being disposed at first, second, third and fourth predetermined positions, respectively, to kinematically guide said first and second steering knuckles through substantially zero toe change when said axle is tilted through a predetermined angle relative to a horizontal plane of the vehicle.

5. A steerable, solid axle suspension apparatus for a vehicle as set forth in claim 4, wherein said first shock absorber connected at said bottom end to said top side of said solid axle adjacent to said first end and said second shock absorber connected at said bottom end to said top side of said solid axle adjacent to said second end.

6. A steerable, solid axle suspension apparatus for a vehicle as set forth in claim 4, wherein each of said leaf spring assemblies further comprises a main leaf plate having a forward eye formed at a forward end of said main leaf plate and a shackle eye formed at a rearward end of said main leaf plate.

7. A steerable, solid axle suspension apparatus for a vehicle as set forth in claim 4, wherein said track bar bracket extends downward to a position immediately rearward of said first end of said drag link.

8. A solid axle suspension apparatus for a vehicle as set forth in claim 4, wherein said track bar has a projected length substantially equal to a projected length of said drag link.

* * * * *